(12) United States Patent
Olmstead

(10) Patent No.: US 10,280,010 B2
(45) Date of Patent: May 7, 2019

(54) SCRAPER ASSEMBLIES FOR REMOVING CARRYOVER MATERIAL FROM A CONVEYOR BELT OR ROLLER

(71) Applicant: Precision, Inc., Pella, IA (US)

(72) Inventor: Rocky George Olmstead, Whittemore, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 15/685,573

(22) Filed: Aug. 24, 2017

(65) Prior Publication Data

US 2019/0062070 A1 Feb. 28, 2019

(51) Int. Cl.
*B65G 45/14* (2006.01)
*B65G 45/16* (2006.01)

(52) U.S. Cl.
CPC ............ *B65G 45/16* (2013.01); *B65G 45/14* (2013.01)

(58) Field of Classification Search
CPC ............................... B65G 45/14; B65G 45/16
USPC ........................................ 198/497, 498, 499
See application file for complete search history.

(56) References Cited

U.S. PATENT DOCUMENTS

| | | | | |
|---|---|---|---|---|
| 5,218,412 A * | 6/1993 | Martin | ............... | G03G 21/0029 15/256.5 |
| 5,489,364 A * | 2/1996 | Marinack | ................. | B31F 1/14 101/425 |
| 5,865,997 A * | 2/1999 | Isaacs | ................. | B01D 33/466 210/232 |
| 6,283,274 B1 * | 9/2001 | Dolan | ................... | B65G 45/16 15/256.5 |
| 6,612,419 B1 * | 9/2003 | Watson | ................. | B65G 45/16 198/497 |
| 6,729,236 B2 * | 5/2004 | Knabe | .................... | B41F 35/04 101/423 |
| 6,860,378 B1 * | 3/2005 | Johannsen | ............. | B65G 45/16 198/497 |
| 7,240,393 B2 * | 7/2007 | Shyu | .................. | G03G 21/0029 118/104 |
| 7,743,909 B2 * | 6/2010 | Berchtold | ............. | B65G 21/04 198/497 |
| 7,819,237 B2 * | 10/2010 | Felton | ................... | B65G 45/16 198/499 |
| 8,662,283 B2 * | 3/2014 | Zieger | ................... | B65G 45/16 198/499 |
| 9,586,765 B2 * | 3/2017 | Krosschell | ............ | B65G 45/16 |
| 9,738,456 B1 * | 8/2017 | Grimm | .................. | B65G 45/16 |
| 2017/0174441 A1 | 6/2017 | Strathhaus | | |

OTHER PUBLICATIONS

Schulte Strathaus, "STARCLEAN Conveyor Belt Cleaners for Industry and Mining," available before Aug. 24, 2017, 18 pgs.
Prospare, "Data Sheet: Starclean Belt Cleaners—Pre-cleaner," available before Aug. 24, 2017, 2 pgs.
CM Products, "Maxi-Tip Long Life Scraper Blades," (2016) 1 pg.

* cited by examiner

*Primary Examiner* — Douglas A Hess
(74) *Attorney, Agent, or Firm* — Armstrong Teasdale LLP

(57) ABSTRACT

Scraper assemblies for removing carryover material from a conveyor belt or roller are disclosed. In some embodiments, the scraper assembly includes a rotatable cam that causes a scraper blade to remove between a lowered position and a raised position in which the blade contacts a belt or roller. Movement of the blade in the raised position may be bound by a crown of the cam and a cam finger that extends from a main body of the cam.

17 Claims, 9 Drawing Sheets

SCRAPER ASSEMBLIES FOR REMOVING CARRYOVER MATERIAL FROM A CONVEYOR BELT OR ROLLER

FIELD OF THE DISCLOSURE

The field of the disclosure relates to scraper assemblies for removing carryover material from a conveyor belt or roller.

BACKGROUND

In conveying operations, an amount of material being conveyed may cling to the outer surface of the conveyor belt after the material has been discharged from the head section of the conveyor. Example conveying operations in which an amount of carryover material clings to the belt include, without limitation, food processing, slurry transport, or waste product. Material that clings from the belt may affect the conveyor performance, reduce product output, cause contamination, and/or reduce cleanliness of the environment in which materials are conveyed. In some instances, material may be conveyed over a roller and carryover material may cling to the roller during operation.

A need exists for scraper assemblies for removing carryover material from a conveyor belt or roller that allow the blade of the scraper assembly to be easily removed for cleaning, that allow the scraper assembly to be easily disassembled for cleaning, and/or that maintain blade contact with the belt or roller without use of tensioner elements.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a scraper assembly for removing carryover material from a conveyor belt or roller. The scraper assembly includes a blade having an edge for scraping material from a rotating conveyor belt or roller. The assembly includes a blade mount and the blade is removably connected to the blade mount. A rotatable cam has an outer edge. The outer edge of the cam contacts the blade mount during rotation of the cam to move the blade between an unlocked position in which the blade is spaced from the conveyor belt or roller and a locked position in which the blade contacts the conveyor belt or roller.

Another aspect of the present disclosure is directed to a scraper assembly for removing carryover material from a conveyor belt or roller. The scraper assembly includes a blade having an edge for scraping carryover material from a rotating conveyor belt or roller. The scraper assembly includes a rotatable cam for moving the blade between an unlocked position in which the blade is spaced from the conveyor belt or roller and a locked position in which the blade contacts the conveyor belt or roller. The scraper assembly includes an actuator interface for rotating the cam between the unlocked position and the locked position.

A further aspect of the present disclosure is directed to a conveyor system. The conveyor system includes a conveyor belt that rotates about two or more pulleys in an endless loop. First and second sidewalls support one or more pulleys. The conveyor system includes a scraper assembly. The scraper assembly includes a blade having an edge for scraping material from the rotating conveyor belt. The scraper assembly includes a blade mount. The blade is connected to the blade mount. The blade mount is pivotally connected to the first and second sidewalls.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
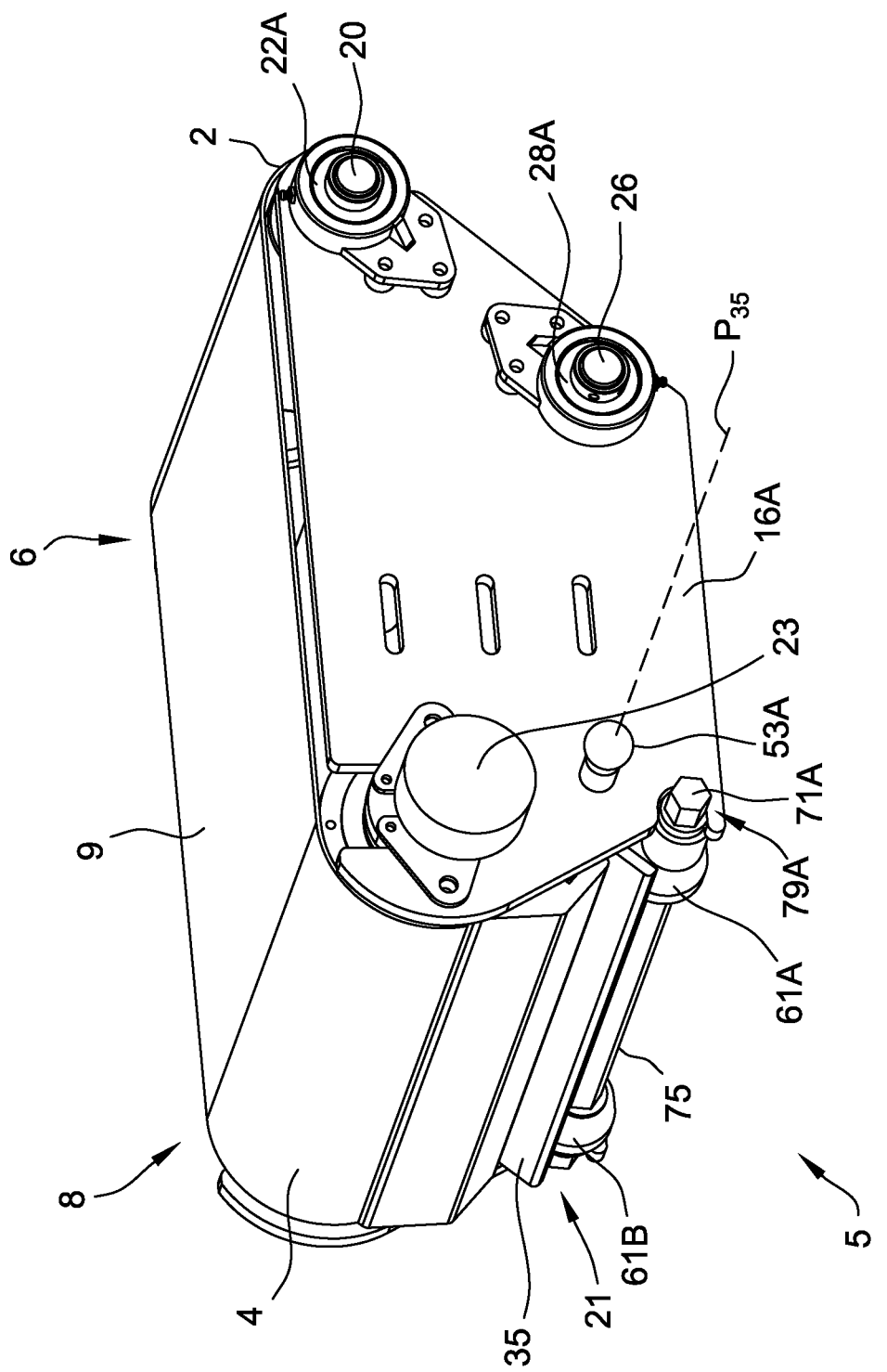
FIG. 1 is a perspective view of a conveyor system with a scraper blade in a raised position.

An example conveyor system 5 is shown in FIG. 1. The conveyor system 5 includes a tail section 6 on which material is loaded and a head section 8 from which conveyed material is discharged. The tail section 6 includes a tail pulley 13 (FIG. 2) and the head section 8 includes a head pulley 17. The conveyor system 5 includes a conveyor belt 9 that forms an endless loop around the tail pulley 13 and the head pulley 17. The head pulley 17 is a drive pulley having a motor (not shown) within the shell of the pulley 17 to rotate the pulley 17 about a shaft 30 (FIG. 3). A junction box 23 may provide power to the motor. In other embodiments, the conveyor system 5 is driven by an outboard motor. The conveyor system 5 includes a take-up pulley 19 for maintaining tension on the conveyor belt 9.

The conveyor system 5 described and shown herein is an example and other arrangements of pulleys (e.g., re-arrangement, addition or elimination of drive, snub, bend and/or take-up pulleys) may be used without limitation unless stated otherwise. While the various embodiments of the scraper assembly may be described and shown herein as scraping material from a conveyor belt, the scraper assembly may generally be used to remove material from any rotating surface unless stated otherwise. For example, embodiments of the scraper assembly may be used to remove material from a roller which conveys material over the surface of the roller.

The conveyor system 5 includes a longitudinal axis A (FIG. 3) that is parallel to the direction of travel of the conveyor belt 9 and that extends between a tail end 2 and a head end 4 of the conveyor system 5. The conveyor system 5 is generally laterally symmetrical in that several components have a corresponding component with the same function opposite the component. Corresponding components of the pair may be indicated herein by use of a reference number followed by "A" and "B" and may be referred to as a "first" component and a "second" component, respectively. While the conveyor system 5 may be described herein with reference to the components of one side of the conveyor system 5, any component designated by "A" or "B" herein or shown in FIGS. 1-9 includes a corresponding component with the same function opposite the component.

Figure 2:
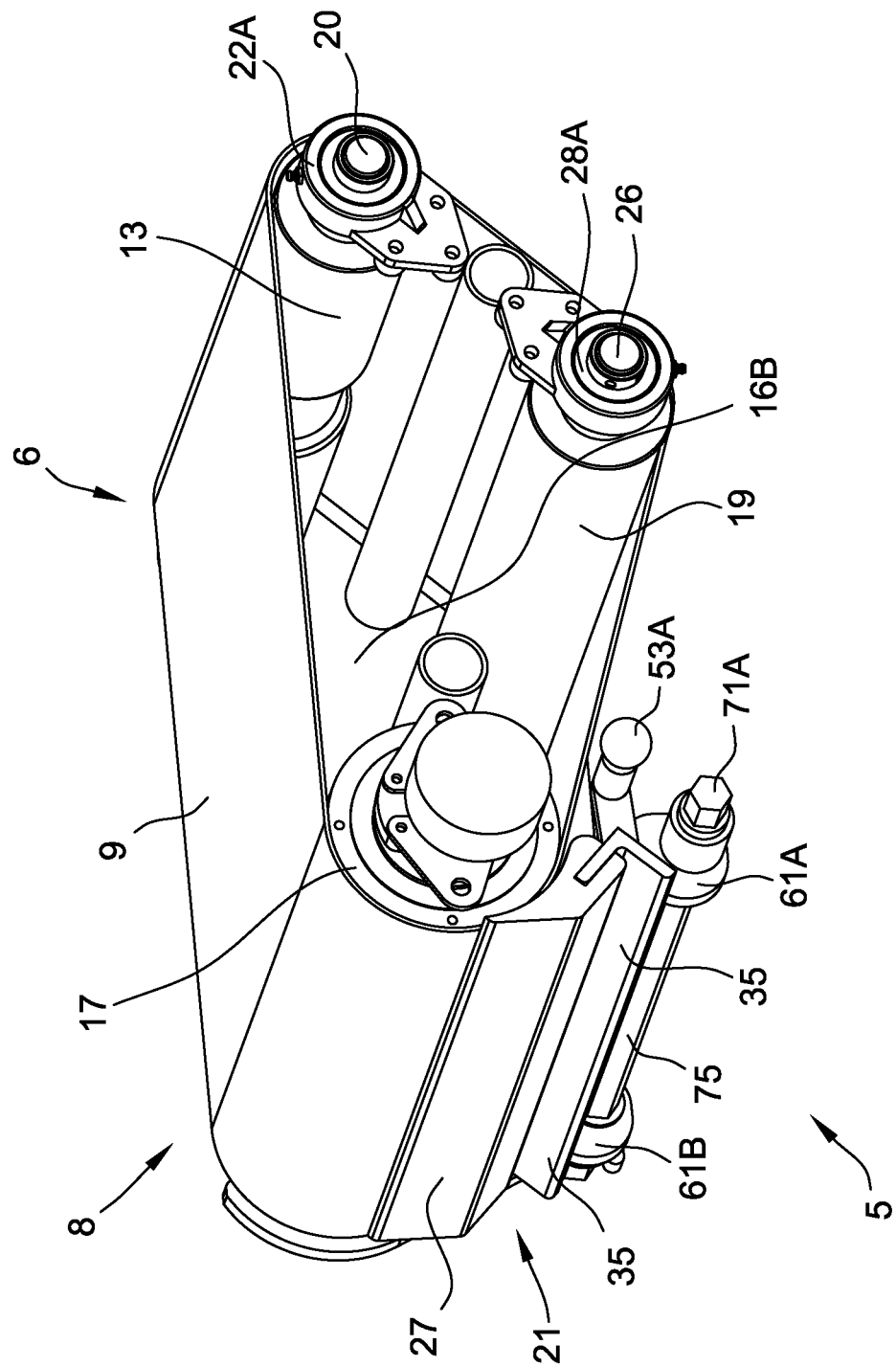
FIG. 2 is a perspective view of the conveyor system with the pulleys of the system being shown.
Figure 3:
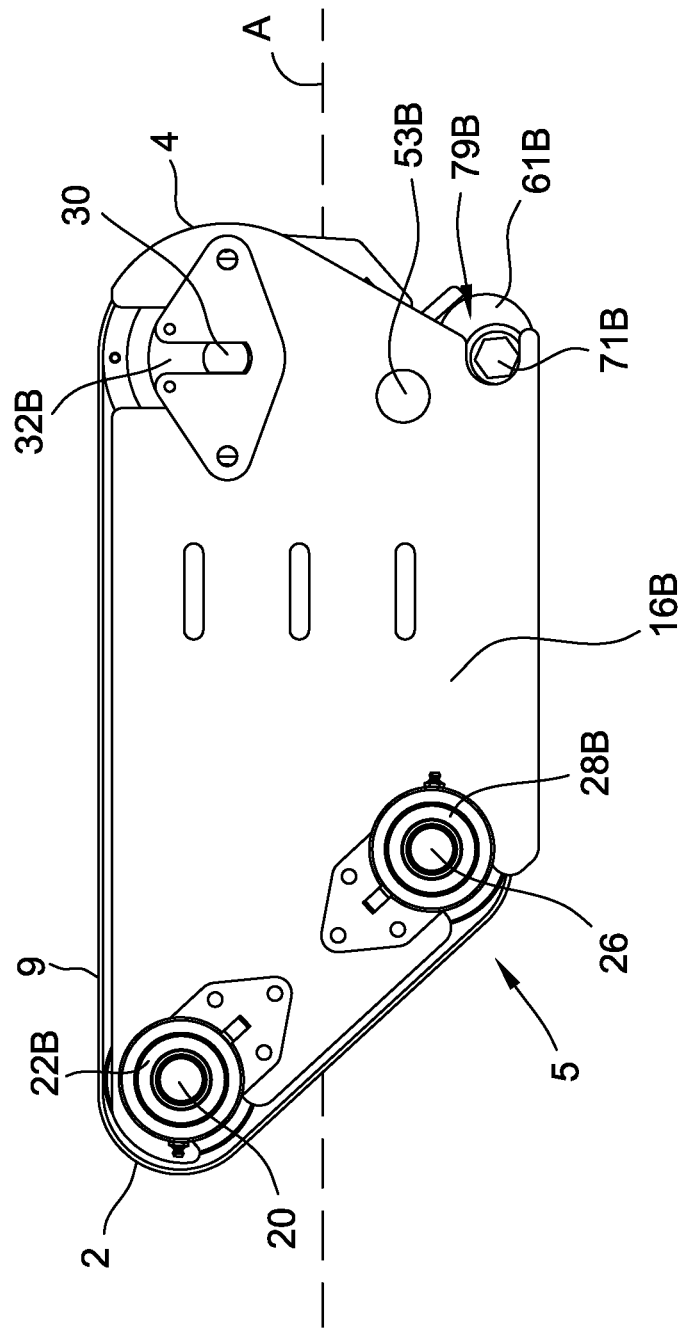
FIG. 3 is a side view of the conveyor system.
Figure 4:
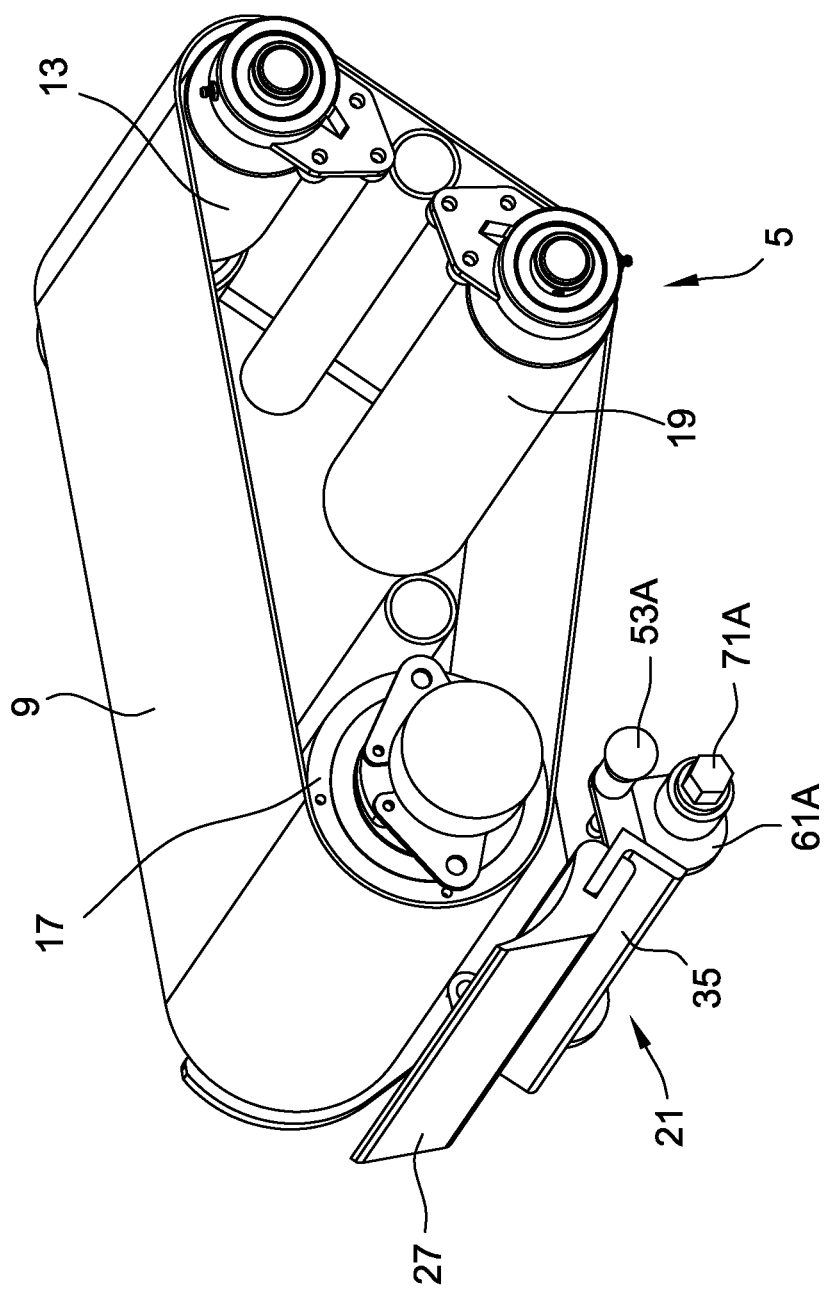
FIG. 4 is a perspective view of the conveyor system with the scraper blade in a lowered position.

The conveyor system 5 includes a first sidewall 16A and a second sidewall 16B (FIG. 2). The sidewalls 16A, 16B may be connected to support legs (not shown) which support the conveyor system 5. In other embodiments, the conveyor system 5 is attached to a conveyor frame (not pictured).

The tail pulley 13, head pulley 17, and take-up pulley 19 are each supported by the first and second sidewalls 16A, 16B. The tail pulley 13 includes a shaft 20 that extends through each sidewall 16A, 16B and through a first tail pulley bearing 22A and a second tail pulley bearing 22B (FIG. 3). The take-up pulley 19 includes a shaft 26 that extends through each sidewall 16A, 16B and through a first take-up pulley bearing 28A and second take-up pulley bearing 28B. The head pulley 17, which in the illustrated embodiment is the drive pulley, includes a shaft 30 (FIG. 3) that is received within slots (slot 32B being shown in FIG. 3) formed within the sidewalls 16A, 16B to secure the shaft 30 and prevent it from rotating.

A scraper assembly 21 removes carryover material (e.g., food products, slurry, waste or the like) that clings to the belt 9 after material is discharged from the head section 8 of the system 5. In the illustrated embodiment, the scraper assembly 21 is adjacent the head pulley 17. In other embodiments, the scraper assembly 21 may be elsewhere along the length of the conveyor belt (e.g., adjacent the tail pulley 13 or disposed between the tail pulley 13 and the head pulley 17 along the return path of the belt 9). The scraper assembly 21 may be adjacent the drive pulley 17 as shown in the illustrated embodiment or may be adjacent a non-drive pulley (e.g., idler, take-up, or snub pulley).

The scraper assembly 21 includes a blade 27. The blade 27 includes an outer edge 31 (FIG. 5) that extends across the width of the conveyor belt 9. The edge 31 contacts the belt 9 as the belt 9 rotates to scrape carryover material from the belt 9. In this regard, the edge 31 of the blade 27 may change during use as the edge 31 may wear. The blade 27 may be made of a polymer such as a thermoplastic. Suitable materials include ultra-high-molecular-weight polyethylene (UHMW) and urethane. The blade 27 may be made of two or more different materials (e.g., dual durometer blades such as a MAXI-TIP Dual Durometer blade available from C.M. Products (St. Peters, Mo.)).

The blade 27 is removably connected to a blade mount 35. The blade mount 35 extends across the width of the conveyor belt 9. The blade mount 35 includes a first leg 45 and a second leg 47. The second leg 47 is angled with respect to the first leg 45 (e.g., at an angle from about 30° to about 150° or about 90° as shown in the illustrated embodiment).

A first leg 45 of the blade mount 35 is received in a slot 39 (FIG. 6) formed in the blade 27. In the illustrated embodiment, the scraper assembly 21 is free of fasteners for connecting the blade 27 to the blade mount 35. The blade 27 rests on the mount 35 by gravity and/or is friction fit onto the first leg 45 of the blade mount 35. In other embodiments, fasteners (not shown) are used to connect the blade 27 to the blade mount 35.

Figure 5:
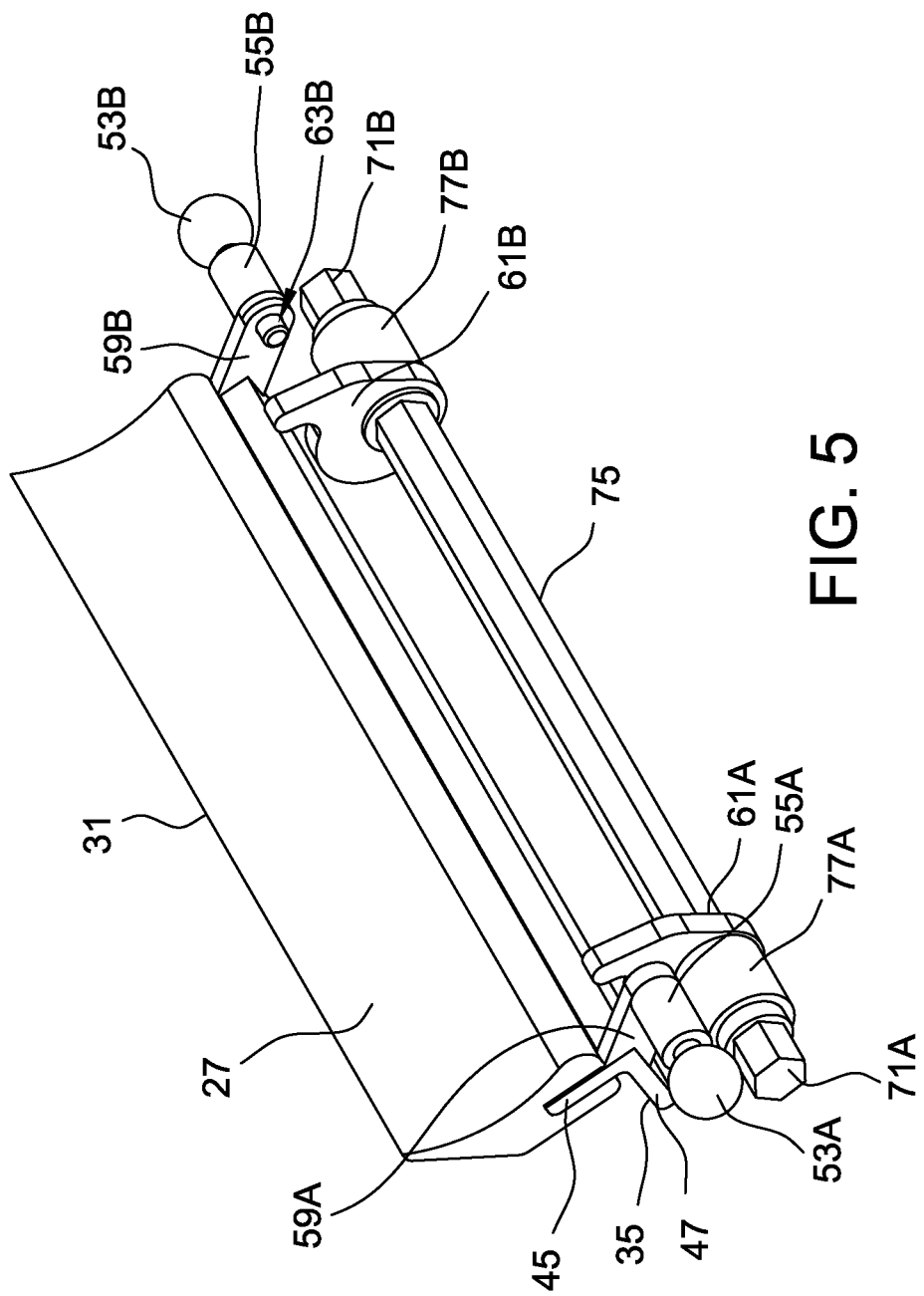
FIG. 5 is a perspective view of a scraper assembly.
Figure 6:
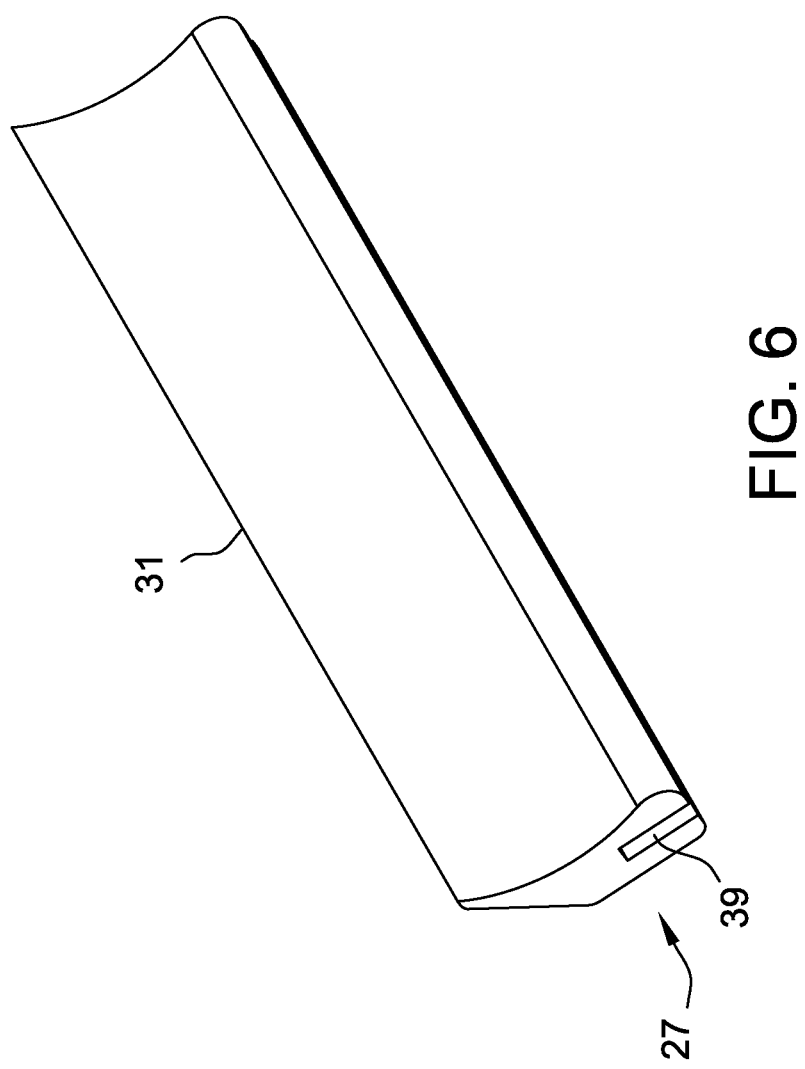
FIG. 6 is a perspective view of a scraper blade.

The blade mount 35 is pivotally connected to each sidewall 16A, 16B of the conveyor system 5. The blade mount 35 is releasably connected to the sidewalls 16A, 16B by fasteners 53A, 53B (FIG. 5). Each fastener 53A, 53B extends through a sleeve or bushing 55A, 55B that is connected to a sidewall 16A, 16B. In the illustrated embodiment, each fastener 53A, 53B is disposed between the tail pulley 13 (FIG. 2) and the head pulley 17 relative to the longitudinal axis A (FIG. 3).

The fasteners 53A, 53B connect to arms 59A, 59B of the blade mount 35. The arms 59A, 59B are connected to the blade mount legs 45, 47. The fasteners 53A, 53B extend through openings (one opening 63B being shown in FIG. 5) in the arms 59A, 59B. The fasteners 53A, 53B may include a push-pull spring pin that extends through the arm openings 63A, 63B or the fasteners 53A, 53B and arm openings 63A, 63B may be threaded.

Figure 7:
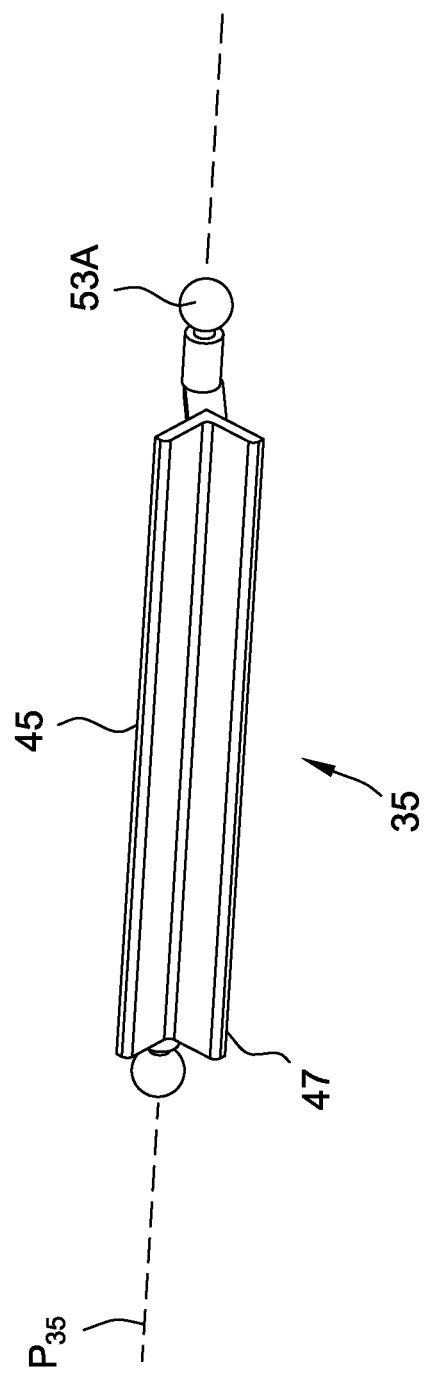
FIG. 7 is a perspective view of a blade mount.

The fasteners 53A, 53B pivot within sleeves 55A, 55B to allow the blade mount 35 to be pivoted toward and away from the belt 9 (FIG. 1) as further discussed herein. The blade mount 35 pivots about a blade mount pivot axis $P_{35}$ (FIG. 7). The blade mount 35 may be disconnected from the sidewalls 16A, 16B by hand (e.g., by grasping a ball knob of the fasteners 53A, 53B upon activation of the spring pin). In other embodiments, tools may be used to disconnect the blade mount 35.

The blade mount 35 may be secured to the sidewalls 16A, 16B by other methods such as, without limitation, rods and pins (e.g., lynch, wire lock or cotter pins), bolts and nuts, clamping or retaining rings, or springs. In other embodiments, the blade mount 35 is removably connected without the use of fasteners (e.g., slotted connections or the like).

In the illustrated embodiment, the scraper assembly 21 is a component of a conveyor system 5. In other embodiments, the scraper assembly 21 is separate from a conveyor system and may include mounting plates, brackets, fasteners, or the like for mounting to an existing conveyor system.

The scraper assembly 21 includes cams 61A, 61B that rotate to move the blade mount 35 and blade 27. Rotation of the cams 61A, 61B causes the blade 27 to move from a lowered, unlocked position (FIG. 4) in which the blade 27 is accessible to remove the blade 27 from the assembly 21 and a raised, locked position (FIG. 1) in which the blade 27 contacts the conveyor belt 9. In the illustrated embodiment, the scraper assembly 21 includes two cams 61A, 61B. In other embodiments, the scraper assembly 21 includes a single cam 61 or more than two cams 61.

The scraper assembly 21 includes s first actuator interface 71A (FIG. 1) and a second actuator interface 71B (FIG. 3). An actuator (not shown) may be connected to either actuator interface 71A, 71B to rotate the cams 61A, 61B. In the illustrated embodiment, the scraper assembly 21 includes two actuator interfaces 71A, 71B and a shaft 75 that connects both cams 61A, 61B to allow the cams 61A, 61B to be rotated from either side of the conveyor system 5. In other embodiments, the scraper assembly 21 includes a single actuator interface 71.

In the illustrated embodiment, the actuator interface 71A is a hex-shank, the hex-shank being an end portion of a hex bar. The hex bar may be connected to an actuator such as a wrench or lever which may be operated by a user. Any actuator interface 71A, 71B that connects the cams 61A, 61B to an actuator may be used unless stated otherwise. Other examples of actuator interfaces include, without limitation, fasteners (bolts and/or nuts) gears, shafts, shanks, or recesses. The actuator may be manually operated by a user or may include a motor (e.g., electrically, pneumatically, or hydraulically powered). The actuator may be manually actuated by a user or controlled by a controller. In some embodiments, a ratchet assembly (not shown) is used to rotate and lock the cam 61 against the belt 9. Generally, the scraper assembly 21 does not include a tensioner (e.g., spring) to bias the blade 27 (FIG. 1) against the belt 9. In other embodiments, the scraper assembly includes a tensioner (e.g., spring).

Each cam 61A, 61B is connected to a sleeve 77A, 77B (FIG. 5) which extends through the sidewalls 16A, 16B (FIGS. 1 and 2) of the system 5. The sleeves 77A, 77B rotate within slots 79A, 79B (FIGS. 1 and 3) within the first and second sidewalls 16A, 16B. In some embodiments, the slots 79A, 79B form an angle with the horizontal plane with the angle being less than 45° (e.g., 0° to 45°) to facilitate removal and installation of the blade mount 35.

Figure 8:
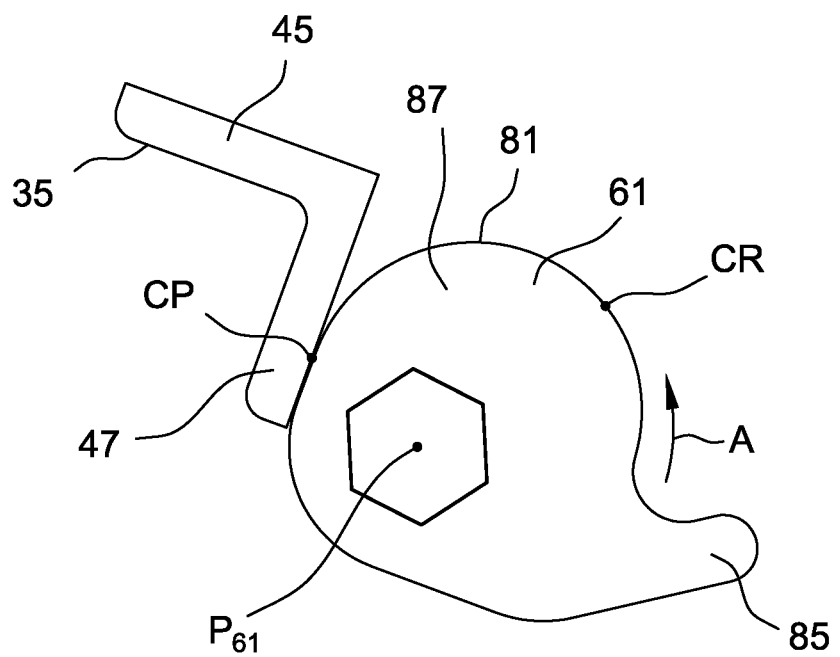
FIG. 8 is a side view of a rotatable cam and scraper mount in a lowered blade position.

Referring now to FIG. 8, each cam 61 includes a pivot axis $P_{61}$ about which the cam 61 rotates. The distance between the edge 81 of the cam 61 and the pivot axis $P_{61}$ varies along the circumference of the cam 61. The second leg 47 of the blade mount 35 rests on the edge 81 of the cam 61. The second leg 47 contacts the edge 81 at a contact point CP. As the cam 61 rotates, the changing distance between the edge 81 of the cam 61 and its pivot axis $P_{61}$ causes the blade mount 35 and blade 27 to rotate about a blade mount pivot axis $P_{35}$ (FIG. 7).

The cam 61 is rotated between a lowered or unlocked position (FIG. 8) in which the blade 27 (FIG. 4) is spaced from the belt 9 and a raised or locked position (FIG. 9) in which the blade 27 (FIG. 2) contacts the belt 9. The direction the cam 61 rotates to move the blade 27 from the lowered to the raised position is shown by arrow A in FIG. 8.

Figure 9:
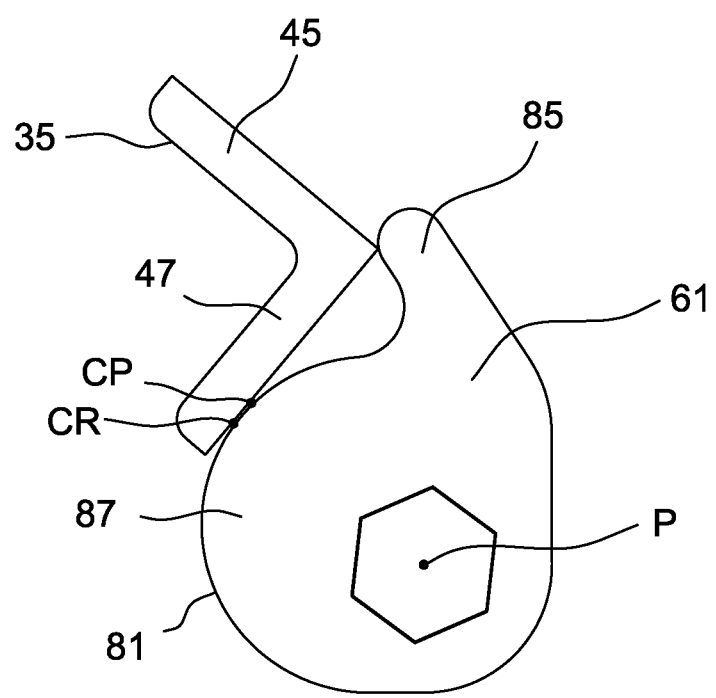
FIG. 9 is a side view of the rotatable cam and scraper mount in a raised blade position.

In some embodiments, the cam 61 includes a crown CR (FIGS. 8 and 9). Generally, the crown CR is the point on the edge 81 of the cam 61 at which the distance from the pivot point axis $P_{61}$ to the edge 81 is the greatest. In the illustrated embodiment, the crown CR is a local crown (i.e., the finger 85 described below is further from the pivot axis P). In other embodiments the crown CR is a global crown. As the blade 27 is moved to the raised position, the crown CR rotates to or even past the contact point CP to "lock" the cam in place (FIG. 9).

The cam 61 includes a finger 85 that extends from a main body 87 of the cam 61. The finger 85 contacts the blade mount 35 in the locked position (FIG. 9). The finger 85 may contact the blade mount 35 at the point at which the first leg 45 forms a corner with the second leg 47 as shown in FIG. 9 or may contact the blade mount at other points along the first leg 45 or second leg 47.

The crown CR and finger 85 bound movement of the cam 61 and bound movement of the blade mount 35 and blade 27 that rest on the cam 61. As the blade 27 contacts the belt 9 during rotation of the cam 61, the blade 27 may flex. The crown CR of the cam 61 prevents the blade 27 from being lowered causing the blade 27 to remain flexed and in contact with the belt 9.

In some embodiments, each component of the scraper assembly 21 is a solid body and/or does not have openings or recesses that catch material moved by the conveyor belt 9.

During operation of the conveyor system 5, the blade 27 is in the raised or locked position and contacts the belt 9 during rotation of the belt 9. In this position, the cams 61A, 61B are bound by the crown CR and finger 85 as shown in FIG. 9. To lower the blade 27 from the belt 9, an actuator connected to one of the actuator interfaces 71A, 71B is operated to rotate the cams 61A, 61B such that the crown CR is forced past the contact point CP formed between the second leg 47 of the blade mount 35 and the cam 61 as shown in FIG. 8. After being lowered, the blade 27 may be pulled from the blade mount 35.

To disassemble the scraper assembly 21, the fasteners 53A, 53B may be operated to release the blade mount 35 from the sidewalls 16A, 16B. The blade mount 35 is pulled from the remainder of the conveyor system 5. The cams 61A, 61B and shaft 75 connecting the cams 61A, 61B are then removed by pulling the cams 61A, 61B from the sidewall slots 79A, 79B.

Compared to conventional scraper assemblies, the scraper assemblies of embodiments of the present disclosure have several advantages. In embodiments in which the blade mount rotates away from the conveyor belt in the lowered position, the blade is accessible to a user to allow the blade to be removed from the mount, such as for cleaning. This may be advantageous in food processing settings in which a high degree of cleanliness is desired. In embodiments in which the blade is not connected to the blade mount by fasteners (e.g., friction fit or where the weight of the blade holds the blade on the mount), the blade may be more simply removed from the mount by a user for cleaning.

The scraper assembly may include an actuator interface which allows a user to move the blade from the lowered and raised position by simply operating an actuator (e.g., by rotating a wrench, lever, handle or the like).

In embodiments in which the blade mount may be detached from the conveyor system by fasteners (e.g., hand-operated knobs, levers, handles, pins or the like), the blade mount may be relatively easily removed for cleaning. The cams may be removed for cleaning after removal of the mount by pulling the cams through slots formed in the conveyor sidewalls.

In embodiments in which the blade mount fasteners are hand operated (e.g., ball knob, lever, pins or the like), the scraper assembly may be disassembled without further tools.

In embodiments in which the scraper assembly includes a cam, rotation of the cam causes the blade to be lowered and raised. The cam may include a crown and a finger portion that bound movement of the cam in a locked position of the blade. The cam may lock the blade in a flexed position of the blade to cause the blade to maintain contact with the belt, even as the blade wears. The blade may lock during rotation of the blade toward the belt without manipulation of components other than the components used to rotate the blade. By flexing the blade in the locked position, the system may be free of a tensioner (e.g., spring) to bias the blade on the belt.

In embodiments in which each component of the scraper assembly is a solid body and/or does not have openings or recesses, the scraper does not catch or hold material moved by the conveyor belt which improves sanitation.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A conveyor system comprising:
    a conveyor belt that rotates about two or more pulleys in an endless loop;
    first and second sidewalls that support one or more pulleys;
    a scraper assembly comprising:
        a blade having an edge for scraping material from the rotating conveyor belt;
        a blade mount, the blade being connected to the blade mount, the blade mount being pivotally connected to the first and second sidewalls; and
        a rotatable cam having an outer edge, the outer edge contacting the blade mount during rotation of the cam to move the blade between an unlocked position in which the blade is spaced from the conveyor belt and a locked position in which the blade contacts the conveyor belt.

2. The conveyor system as set forth in claim 1 wherein the blade is removably connected to the blade mount.

3. The conveyor system as set forth in claim 1 wherein the cam has a pivot axis about which the cam rotates, the distance between the edge of the cam and the pivot axis varying along the circumference of the cam.

4. The conveyor system as set forth in claim 1 wherein the cam has a finger, the finger contacting the blade mount in the locked position.

5. The conveyor system as set forth in claim 1 wherein the outer edge of the cam contacts the blade mount at a contact point, the cam having a crown, the crown of the cam being rotated past the contact point to move the blade from the unlocked position to the locked position.

6. The conveyor system as set forth in claim 1 wherein the rotatable cam is a first rotatable cam, the scraper assembly comprising a second rotatable cam, the second rotatable cam having an outer edge, the outer edge contacting the blade mount during rotation of the second cam to move the blade between an unlocked position in which the blade is spaced from the conveyor belt and a locked position in which the blade contacts the conveyor belt.

7. The conveyor system as set forth in claim 6 wherein the scraper assembly comprises a shaft that connects the first rotatable cam and the second rotatable cam.

8. The conveyor system as set forth in claim 1 wherein the blade has a slot and the blade mount has a leg, the leg being received in the blade slot.

9. The conveyor system as set forth in claim 1 wherein the blade mount has a first leg and a second leg, the first leg being connected to the blade, the second leg contacting the rotatable cam.

10. The conveyor system as set forth in claim 1 wherein the scraper assembly comprises an actuator interface for rotating the cam between the unlocked and the locked position.

11. The conveyor system as set forth in claim 10 wherein the actuator interface is selected from a fastener, gear, shaft, shank, and recesses.

12. The conveyor system as set forth in claim 10 further comprising an actuator connected to the actuator interface, the actuator being a wrench, lever or handle.

13. The conveyor system as set forth in claim 10 further comprising an actuator connected to the actuator interface, the actuator being a motor.

14. The conveyor system as set forth in claim 1 wherein the blade mount is releasably connected to each sidewall by a fastener.

15. The conveyor system as set forth in claim 14 wherein a single fastener releasably connects the blade mount to the first sidewall and a single fastener releasably connects the blade mount to the second sidewall.

16. The conveyor system as set forth in claim 14 wherein the conveyor system has a longitudinal axis, the conveyor belt being looped around a head pulley and a tail pulley, the fastener being disposed between the head pulley and the tail pulley relative to the longitudinal axis.

17. The conveyor system as set forth in claim 1 wherein the scraper assembly is free of fasteners for connecting the blade to the blade mount.

* * * * *